United States Patent Office 3,096,602
Patented July 9, 1963

3,096,602
PACKAGING METHOD
Frederick C. Newmaker, Jr., Cleveland, Ohio, assignor to The Dow Chemical Company, Midland, Mich., a corporation of Delaware
No Drawing. Filed Jan. 5, 1962, Ser. No. 164,590
4 Claims. (Cl. 53—22)

The present invention relates to an improved method for providing packaged articles. In particular, it relates to a method for providing packaged articles with a covering of polyethylene or the like non-aromatic hydrocarbon olefin polymer that is in general conformity to the shape of the article, i.e., the so-called "skin package."

One important feature in preparing skin packages is to insure a tight bond between the overlay or skin of plastic material and the base material upon which the article to be packaged is supported. The base material is usually a paperboard or cardboard or similar material because of the inherently advantageous properties of such a material. If a secure bond is not provided between the base material and the plastic overlay, thus providing a tight and conforming layer over the article, the article may be allowed to move within the package and be damaged. Or, it may escape entirely from the package. At the very least, any relaxing of the package away from the article presents an unattractive package to the buying public.

The previous methods that have achieved some success in securing the required bond each involve some disadvantage.

The method of skin packaging requires that the base material be air permeable so that a vacuum may be pulled through the base to bring the plastic overlay in intimate and conforming contact with the article to be packaged. Thus, any alterations of the base material to enhance the bond between the base and the plastic overlay should not interfere with the permeability of the base.

One method practiced is to provide a perforated base board that has applied thereover a layer of adhesive to bind the plastic to the base. The perforations provide the permeability that is prevented or obscured by the adhesive. The perforating step is an additional and time consuming step in addition to reducing the rigidity and strength of the base material.

Another method, which avoids the perforation step, is to apply the adhesive material in strips or similar non-continuous manner to the board, or, alternatively, apply the adhesive over the entire board and thereafter remove portions of it to provide areas of air permeability. This method requires care that ridges of adhesive do not build up with the resulting drawback that the plastic overlay or skin does not come into uniform contact with the surface of the base board. Additionally, there is the tendency of the base board to have a nonuniform appearance due to the discontinuity of the adhesive coating. Moreover, different application methods, applicating dies or the like, and amounts and types of adhesives may necessarily have to be resorted to due to the size of the base board and the particular condition of the board, e.g., whether it is a printed board or whether it is heavily sized, filled or coated with any other material such as a lacquer or the like.

Particular difficulty has been encountered when polyethylene and such other polyolefin films have been attempted to be utilized in skin packaging. Polyethylene and the like film and other articles, as is well known, commonly have a smooth and sleek, relatively slippery and wax like surface which is poorly adapted to provide for suitable adhesion or anchorage to other materials by mere physical attachment. In addition, the relatively inert chemical nature of polyethylene and the like non-aromatic hydrocarbon polyolefins resist the efficient attachment of most materials by chemical inter-linkage or bonding.

It is, therefore, the primary object and chief concern of the present invention to provide an efficient and expedient method for preparing packaged articles with a non-aromatic hydrocarbon polymer layer conforming to the general shape of the article and being in skin-like relationship with the article with the least amount of preparatory and modifying treatments.

The foregoing and still further objects are readily achieved by and in accordance with the present invention wherein an article to be packaged is placed on a base board of cardboard, paperboard or similar air permeable material; a heated non-aromatic hydrocarbon olefin polymer sheet placed over the article is then made to come into contact with the periphery of the base board and a seal is effected between said sheet and said base board; air is withdrawn from the space between the sheet and the base board through said base board such that said sheet is made to draw down on said article in a skin-like relationship to said article; and subsequently cooling the so-formed package; the surface of said non-aromatic hydrocarbon olefin polymer sheet that is brought into contact with said base board and said article having been at least partially oxidized and having applied thereover between about 5 and about 100 grams of a polyalkyleneimine per 1000 square feet of said olefin polymer sheet surface.

The package that is prepared in accordance with the invention has excellent attributes regards, uniformity in appearance and permanency of the bond between the applied polyolefin sheet and the base board. A tight, closely fitting layer of the polyolefin is provided over the article. No evidence of relaxing and drawing away from the article of the polyolefin layer is noted even after extended periods of time and considerable handling.

The present invention, as will be appreciated by those skilled in the art, provides the further advantage of allowing but a single film applicable for a wide variety of base boards regardless of the condition of or treatments given the board. Thus, inventory problems are simplified. The films having the polyalkyleneimine applied thereto are perfectly transparent so that no difficulties are encountered in that regard.

The method of the present invention can be carried out on any of the conventional skin packaging apparatus such as for instance, that disclosed in U.S. Patent No. 2,832,094.

The polyethylene or other non-aromatic hydrocarbon polyolefin which is employed in the practice of the present invention may be any of such polymers of the normally solid and film-forming nature. For example, the polymers of ethylene which are employed may be those, or similar to those, which sometimes are referred to as "polyethenes" and which may be obtained by polymerizing ethylene in a basic aqueous medium and in the presence of polymerization-favoring quantities of oxygen under relatively high pressures in excess of 500 or 1,000 atmospheres at temperatures which may be between 150° and 275° C. Or, if desired, the ethylene and other non-aromatic hydrocarbon olefin polymers may be essentially linear and unbranched polymers, or polyolefin products similar to these materials. The essentially linear and unbranched, macromolecular, high density polyethylenes have been referred to as "ultrathenes." They ordinarily have greater apparent molecular weights (as may be determined from such characteristics as their melt viscosities and the like) than the "polythene" type polyethylenes which are usually in excess of at least about 20,000 and generally in excess of about 40,000; densities of about 0.94–0.96 grams per cubic centimeter; and melting points in the neighborhood of 125–135° C. They are also ordinarily found to have a more crystalline nature than conventional polyethylenes and may contain less than 3.0 and even less than 0.3 methyl radicals per 100 methylene groups in the polymer molecule. The essentially linear and unbranched polymers of ethylene and other non-aromatic hydrocarbon olefins may be obtained under relatively low pressures of 1 to 100 atmospheres using such catalysts for polymerizing the ethylene or other olefin as mixtures of strong reducing agents and compounds of group IV–B, V–B, and VI–B metals of the periodic system; chromium oxide on silicated alumina; hexavalent molybdenum compounds; and charcoal supported nickel-cobalt.

As is apparent, the polyolefin polymers utilized in the practice of the present invention are generally prepared by polymerization of monoolefinic aliphatic olefin monomers, such as ethylene, propylene, butylene and so forth (including polymerizable mixtures thereof) that contain from 2 to about 8 carbon atoms, which monomeric olefins are frequently known as being 1-olefins due to their characteristic terminally unsaturated structures.

As indicated, it is an essential feature of the instant invention that the polyolefin films that are utilized for the skin or overlay, have at least one side partially oxidized. This oxidation may be accomplished by any of the conventional techniques suited for the purpose. Among the more popular are the process of exposing the film to an oxidizing flame or an electrostatic treatment. Additionally, film that has been prepared from a manufacturing process wherein temperatures in excess of about 350° F. are encountered during the film forming process will generally provide a sufficiently oxidized surface. Chill-roll cast film or film prepared by extruding into a water bath are among these latter processes. These types of films are contrasted to the films prepared by extruding and distending a bubble of the film which ordinarily involves temperatures considerably below 350° F.

The polyalkyleneimines which are applied to the polyolefin overlay or skin of the invention to secure the desired effective bond between the paper board and polyolefin layer and afford the tight skin-like effect over the article are advantageously one of the polyethylene imines which are of the general structure:

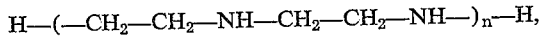

in which *n* has a numerical value of at least 1 and may be a larger, plural integer having a value as great as 1,000–2,000 and more. Thus, when a polyethyleneimine is utilized for treating the surface of the polyolefin sheet, it may be of any desired molecular weight in which the material can be obtained. It is generally most advantageous, however, to avoid use of very low molecular weight materials having excessive volatilities.

As is apparent, other polyalkyleneimines equivalent to polyethyleneimines (obtained by polymerization, in the known way, of the corresponding alkyleneimines) may also be utilized to treat the surface of the polyolefin sheet of overlay or skin in place of, or in combination with, the polyethyleneimine. Ordinarily it is of greatest practical significance for these to include any of the homologous polyalkyleneimines which are comprised of alkylene units of less than about 4 carbon atoms. In most cases, although no limiting implications are intended, the polyalkyleneimines of greatest interest to employ are the relatively water-soluble materials whose viscosity in 20 percent aqueous solution at 20° C. are on the order of 100 poises.

Only a very small quantity of the polyalkyleneimine need be deposited on the surface of the overlay sheet. In general, an amount between about 5 grams and 100 grams per thousand square feet of overlay surface are suitable to facilitate and promote a sufficient bond between the polyolefin polymer layer and the base board so that no relaxing of the film from the base board and packaged article results. Frequently, between about 20 and 50 grams per thousand square feet provides an entirely satisfactory result.

When the polyalkyleneimines (such as polyethyleneimine) are employed in too great a concentration on the overlay surface, they tend to result in undesirably weak and unsatisfactorily tight-fitting skin structures.

Although it can be directly applied if desired, the deposition of the polyalkyleneimine is generally better and more conventionally and easily accomplished from a solution or dispersion of the treating agent in a suitable solvent, such as acetone, methyl ethyl ketone, methyl isopropyl ketone, lower alkyl alcohols (particularly those of less than 4 carbon atoms), etc., or even water. Methanol, ethanol and isopropanol are oftentimes found to provide optimum solvent behavior for the polyalkyleneimine. Advantageously, a relatively dilute solution of the polyalkyleneimine treating agent in the solvent is employed, such as one having a concentration of the polyalkyleneimine between about ⅛ and ½ percent by weight of the dissolved agent. This facilitates the uniform and general deposition over the surface of the polyolefin film overlay of the relatively minute quantities of polyalkyleneimine needed.

As in the prior art practices, if the polyalkyleneimine is applied to the base board, the air permeability of the base board is reduced. This affects the amount of suction that must be used, if it is effective at all, and thus the degree of tightness and conformity the films has to the article being packaged. Additionally, the solvents employed from which the polyalkyleneimine is applied may have adverse effects on the base board itself or on any printing or similar treatment that may be essential to saleability of the package.

The coating application of the polyalkyleneimine agent may be made by spraying or spread coating the solution thereof on the surface of the polyolefin overlay sheet. Necessarily, the coating of the strongly cationic polyalkyleneimine agent is dried by air or by means of heat at an elevated temperature on the surface of the overlay prior to the actual packaging operation.

In this connection, it is generally desirable to employ a relatively fugacious solvent in order to allow rapid and ready drying (with minimized or no external application of heat) of the applied polyalkyleneimine solution. Thus, isopropanol, ethanol, or methanol are, as has been indicated, most beneficial to employ as solvents for the applicating solution of the polyalkyleneimine. Such solvents can be easily dried in cool air (such as air at room temperature or with minimum requirements for heat) to deposit the polyalkyleneimine on the surface of the overlay. Frequently, however, the use of warm air is found to be more practical for drying, especially when conditions of relatively high humidity in the atmosphere are encountered.

The invention finds particularly beneficial results in affording excellent skin packages wherein the base board material is printed upon with advertising material and other high fashion coloring to attract the buyers attention and appeal. Similarly, advantageous results are obtained when the base board is a heavily sized or filled paperboard, cardboard or the like. For one reason or another, adherance between a polyolefin film and a paperboard and similar structures that have been printed upon, heavily filled or sized is exceptionally unsuited for most purposes. However, the practice of the present invention does not distinguish between paperboard so-treated and any other type of paperboard. Thus, its applicability is, for all practical purposes, unlimited regards the source or condition of the paperboard utilized for the base in the package, excellent results being obtained in all cases.

Another excellent feature of the present invention is that the overlay or skin film that has been treated with the polyalkyleneimine is usually readily strippable from the article package. This is, for obvious reasons, a desirable feature. If needed, however, a suitable release agent may be applied to the article to facilitate stripping of the skin film therefrom.

As indicated, the present invention can be practiced with conventional skin packaging apparatus and techniques. Thus, the non-aromatic hydrocarbon olefin polymer film is heated to a temperature in the neighborhood of its softening temperature, but less than its melting point, and then positioned over and in contact with the base board on which is situated the article to be packaged. The edge of the film is clamped about the periphery of the base board and a vacuum sufficient to pull down the particular film, and advantageously at least about 6–8 inches of mercury, is applied to the bottom side of the base board. In this respect, the thickness of the film is not too critical. Ordinarily 3–8 mil film is beneficially employed. The film is thus drawn down around and in tight skin-like engagement with the article. The package is subsequently removed from the packaging apparatus and cooled to room temperature.

In order to further illustrate the invention, a supply roll of 6 mil high pressure polyethylene of the "polythene" type was surface treated on one side with a solution of about ⅜ lb. of polyethyleneimine (PEI) per 100 pounds of ethanol. The PEI had a molecular weight of about 7000. The surface of the polyethylene film to which the PEI had been applied had been subjected to a conventional electrostatic treatment in order to at least partially oxidize the film surface. The PEI solution was applied to the film from a gravure roll after which the treated film was dried in an oven at about 150° F. A deposit of about 22 grams of PEI per 1000 ft.$^2$ of film was thus effected. A piece of the PEI-containing film about 20 x 32 in. was fixed in a frame of a skin packaging machine and heated to about 350–375° F. in about 20 seconds with radiant heating. The heated film in the frame (such that it was under slight tension) was placed over a piece of printed 20 x 27 inch cardboard about 0.025 inch thick upon which was situated a bare metal hinge and a bare metal cupboard door handle. A seal was effected between the film and cardboard about the periphery of the cardboard. A vacuum or suction of about 15 inches of mercury was applied to the bottom of the cardboard. The film was thus caused to collapse or shrink down and around the hinge and handle and upon the surface of the cardboard. The package was partially cooled and was then removed from the machine and allowed to cool to room temperature.

An excellent package was obtained in all respects. It was uniform in appearance and the hinge and handle were firmly held to the cardboard. The film was in skin-like relationship to the articles and the film was firmly bonded to the cardboard adjacent the periphery of the articles. There was no sign over a period of weeks of the film relaxing or pulling away from the cardboard surface around the articles. When the package was opened the "skin" peeled away from the hinge and handle with ease.

In contrast, when the same procedure as the foregoing was followed, excepting in one instance to employ a polyethylene film that had not been at least partially oxidized, and in the other instance to use a film that had been at least partially oxidized but did not contain any PEI, significantly inferior and undesirable packages were obtained. In both instances, on inspecting the packages eight hours after their preparation, it was observed that the film had pulled away from the cardboard base about ¼ to ½ inch around and measured from the periphery of the articles.

Certain changes and modifications in the practice of the present invention can be readily entered into without substantially departing from its intended spirit and scope. Therefore, it is to be fully understood that the invention is not to be limited or in any way restricted by the preferred embodiments thereof which are set forth and delineated in the hereto appended claims.

What is claimed is:

1. In the method for packaging articles comprising positioning an article to be packaged upon an air permeable paperboard base, bringing into contact with said article and said base a heated film of a non-aromatic olefin polymer, drawing said film into skin-like relationship with said article by applying a suction to the side of said base opposite that on which said article is positioned, and subsequently cooling the package so-formed, the improvement comprising, prior to bringing into contact said article and said base with said heated film, providing said film with an at least partially oxidized surface, and applying over said oxidized surface between about 5 and about 100 grams per thousand square feed of film surface of a polyalkyleneimine comprised of alkylene units containing from 2 to about 4 carbon atoms, said oxidized surface having applied thereover the polyalkyleneimine being the surface that is brought into contact with said article and said base.

2. The method of claim 1, wherein said non-aromatic olefin polymer is polyethylene.

3. The method of claim 1, wherein said polyalkyleneimine is polyethyleneimine.

4. The method of claim 1, wherein said paperboard base has been printed upon.

References Cited in the file of this patent

UNITED STATES PATENTS

| | | |
|---|---|---|
| 2,828,799 | Harrison | Apr. 1, 1958 |
| 2,861,405 | Hanford | Nov. 25, 1958 |
| 2,984,056 | Scholl | May 16, 1961 |
| 2,989,827 | Grotld | June 27, 1961 |
| 3,022,614 | Dreyfus et al. | Feb. 27, 1962 |
| 3,031,072 | Kraut | Apr. 24, 1962 |